(12) United States Patent
Sheng

(10) Patent No.: US 9,470,835 B2
(45) Date of Patent: *Oct. 18, 2016

(54) THIN FLAT PANEL LED LUMINAIRE

(71) Applicant: CT Advanced LED Lighting, LLC, Pasadena, CA (US)

(72) Inventor: Yu Lin Sheng, KunShan (CN)

(73) Assignee: CT Advanced LED Lighting, LLC, Pasadena, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/991,840

(22) Filed: Jan. 8, 2016

(65) Prior Publication Data

US 2016/0124137 A1 May 5, 2016

Related U.S. Application Data

(63) Continuation of application No. 14/617,512, filed on Feb. 9, 2015, now Pat. No. 9,234,994, which is a continuation of application No. 13/467,912, filed on May 9, 2012, now Pat. No. 8,950,921.

(30) Foreign Application Priority Data

May 11, 2011 (CN) .................. 2011 2 0147703 U

(51) Int. Cl.
| | |
|---|---|
| *F21V 7/04* | (2006.01) |
| *F21V 5/00* | (2015.01) |
| *F21V 13/02* | (2006.01) |
| *F21V 8/00* | (2006.01) |
| *F21S 8/04* | (2006.01) |
| *F21Y 101/02* | (2006.01) |
| *F21Y 103/00* | (2016.01) |

(52) U.S. Cl.
CPC ............... *G02B 6/0043* (2013.01); *F21S 4/28* (2016.01); *F21S 8/04* (2013.01); *G02B 6/0051* (2013.01); *G02B 6/0055* (2013.01); *G02B 6/0061* (2013.01); *G02B 6/0065* (2013.01); *G02B 6/0068* (2013.01); *G02B 6/0073* (2013.01); *F21Y 2101/02* (2013.01); *F21Y 2103/003* (2013.01)

(58) Field of Classification Search
CPC .......... F21V 5/00; F21V 13/02; F21V 15/01; F21S 8/04; F21S 8/06; F21Y 2101/02
See application file for complete search history.

(56) References Cited

U.S. PATENT DOCUMENTS

| | | |
|---|---|---|
| 5,178,447 A | 1/1993 | Murase et al. |
| 6,540,373 B2 | 4/2003 | Bailey |

(Continued)

FOREIGN PATENT DOCUMENTS

WO WO2011/013405 2/2011

*Primary Examiner* — Joseph L Williams
(74) *Attorney, Agent, or Firm* — Rutan & Tucker, LLP; John K. Fitzgerald

(57) ABSTRACT

The invention described herein is a very thin flat panel LED luminaire, including a flat baseboard, a flat reflection panel, a flat acrylic panel, a flat diffusion panel, LED bar, and aluminum encasement frame which combines with the baseboard to form the chassis for the luminaire. The LED bar is placed along either or both sides of the stack. The acrylic panel is printed with a mesh-like mask pattern of dots in a pattern in which the density of the pattern is decreases the farther away from the LED bar the pattern is, differentially coupling the light from the point source LED bar from the reflection panel into the flat acrylic panel so that illumination across the luminaire is substantially uniform.

12 Claims, 5 Drawing Sheets

(56) References Cited

U.S. PATENT DOCUMENTS

| | | |
|---|---|---|
| 6,840,652 B1 | 1/2005 | Hymer |
| 6,857,756 B2 | 2/2005 | Reiff et al. |
| 6,871,983 B2 | 3/2005 | Jacob |
| 6,902,291 B2 | 6/2005 | Rizkin et al. |
| 6,994,452 B2 | 2/2006 | Rozenberg et al. |
| 7,125,147 B2 | 10/2006 | Waring |
| 7,246,921 B2 | 7/2007 | Jacobson et al. |
| 7,270,459 B2 | 9/2007 | Waring |
| 7,401,966 B2 | 7/2008 | Liao |
| 7,520,636 B2 | 4/2009 | Van Der Poel |
| 7,547,112 B2 | 6/2009 | Kim |
| 7,665,866 B2 | 2/2010 | Mayer et al. |
| 7,841,738 B2 | 11/2010 | Engel |
| 8,066,407 B2 | 11/2011 | Remus et al. |
| 8,111,011 B1 | 2/2012 | Tu et al. |
| 2008/0037272 A1 | 2/2008 | Song et al. |
| 2010/0254121 A1 | 10/2010 | Zhou |
| 2010/0296021 A1 | 11/2010 | Jung et al. |

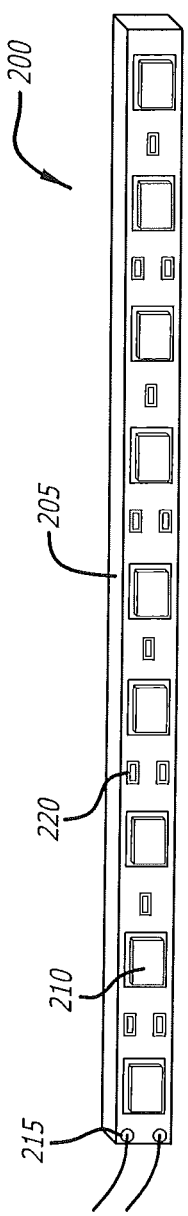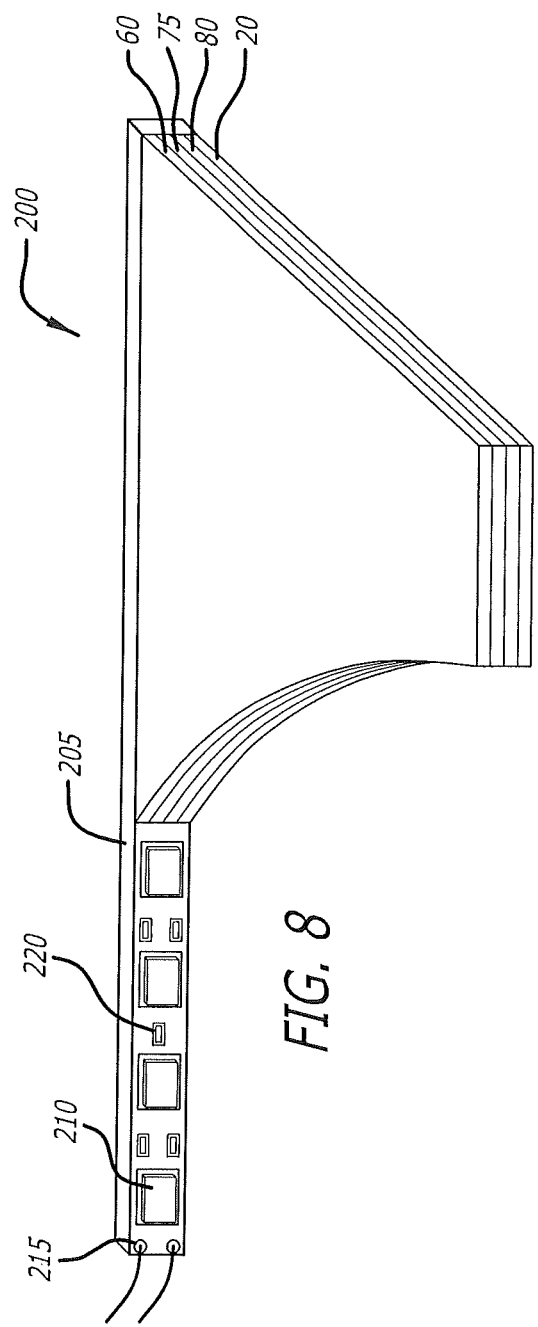

THIN FLAT PANEL LED LUMINAIRE

CROSS-REFERENCES TO RELATED APPLICATIONS

This is a continuation application of U.S. application Ser. No. 14/617,512, filed Feb. 9, 2015, now U.S. Pat. No. 9,234,994, issued Jan. 12, 2016, which is a continuation application of U.S. application Ser. No. 13/467,912, filed May 9, 2012, now U.S. Pat. No. 8,950,921, issued Feb. 10, 2015, titled "THIN FLAT PANEL LUMINAIRE," which claims priority from People's Republic of China Application No. 201120147703.9, filed May 11, 2011, incorporated herein by reference in its entirety.

BACKGROUND

1. Field of the Invention

The present invention is related to the application of the Light Emitting Diode ("LED") light source to form a very thin LED flat luminaire for general indoor and outdoor lighting purposes. The luminaire, specifically, reflects and diffuses light from an LED light source which is installed along the edges of the very thin light structure. The light rays are diffused in a manner that provides uniform illumination and color temperature across the luminaire such that there is no irritation from directly looking at the light source.

2. Description of the Related Art

LED technology provides for the manufacture of light fixtures that offer high lumen illumination, low energy consumption, and extended life cycle compared to traditional lighting sources such as fluorescent or incandescent light bulbs. However, in current applications of LED technology for general lighting purposes, the LED light source is arranged so that the LED light provides illumination directly to the area/space requiring light. This results in glare which may be uncomfortable to the eyes when the LED light source is looked at directly. Another current application of LED lighting technology uses an LED light source to illuminate the backside of a display board to display graphics and/or textual information to a user. In this approach, the displaying material acts to diffuse the light from the LED light source.

Another approach which incorporates a reflection or diffusion panel including a plurality of tiny bumps distributed across the panel has also been used in an attempt to diffuse light from and LED source arranged along the side of the luminaire. This approach utilizes internal reflections within the bumps to spread the light over the surface of the luminaire. However, the usage of such a structure results in increased complexity of manufacture, and increased thickness of the luminaire.

What has been needed, and heretofore unavailable, is a thin, easily manufactured luminaire that provides uniform illumination across the surface of the luminaire. Such a luminaire would be side lit by one or more LED light sources, yet be thin, reliable, and easy to manufacture. The luminaire would be configured to (i) reflect the sharp light rays directly emitting from the LED light source and (ii) distribute the light rays uniformly to the space without compromising the amount of lumens provided by the luminaire. Furthermore, the resulting light rays from the luminaire should provide a comfortable lighting experience.

SUMMARY OF THE INVENTION

In its most general aspect, the invention provides a very thin LED flat luminaire having a simple structure that provides uniform light distribution without glare and visually comfortable lighting. The luminaire generally includes a flat baseboard, a flat reflection panel, a flat acrylic panel, a diffusion panel, a bar with multiple light emitting diodes inlaid in the bar ("LED bar") and an aluminum encasement frame.

In one aspect, the luminaire device is assembled by stacking of the baseboard and panels. The order of the assembly from top down is the baseboard, the reflection panel, the acrylic panel, and the diffusion panel. The LED bar is positioned on either side, or both sides of the stack. The LED light source on the bar faces toward the stack. The aluminum encasement frame clamps the stack together with the LED bar inside of the encasement frame. The encasement frame is screwed together with steel joiner to form the chassis for the entire luminaire device. In alternative aspects, two types of joints have been designed between the encasement frame and the baseboard. One aspect includes an "U" shape encasement frame clamped onto the baseboard and the diffusion board. The other aspect is an "L" shape encasement frame with the baseboard screwed onto the encasement frame edge. In other aspects, a transformer is provided to convert 110/220V alternating current to the appropriate direct current application for the size of the luminaire.

In another aspect, the acrylic panel is printed with black dots in a mesh-like pattern on one side. The size of the dots and the thickness of the mesh connecting the dots is larger, resulting in a less dense pattern farther away from the LED light bar that couples more light from the reflection panel into the acrylic panel farther away from the LED light bar; the size of the dots is smaller, as is the thickness of the mesh connecting the dots closer to the LED bar, resulting in a denser pattern that couples less light from the reflection panel into the acrylic panel closer to the LED bar. This mesh-like pattern thus provides for a uniform transmission of light across the area of the acrylic panel into a diffusion panel for illuminating a space. The printed pattern is determined by the shape and size of the luminaire, area of the light emitting surface, and wattage of the light emitting diodes.

In yet another aspect, the printed pattern is designed with strict optical science through proprietary computer applications. This printed pattern "filters" the light intensity to achieve uniform light distribution.

In yet another aspect, the LED bar is positioned to emit light to the edge of the flat reflection panel. The flat reflection panel then reflects the light to the acrylic panel. The acrylic panel has a mesh-like pattern of dots across the face of the acrylic panel, the density of the dots and mesh being adjusted in such a manner that the light transmitted by the reflection panel into the acrylic panel has been filtered for uniform evenness through the acrylic panel. Thus, the intensity of the light being emitted by the acrylic panel is relatively uniform across its face. Once the light is filtered through the acrylic panel, the light passes through the diffusion panel which is, in one aspect, an optical polypropylene material that has been treated to provide a magnifying effect. The diffusion panel may further amplify and distribute the light uniformly to the space to be illuminated, resulting in a soft and warm light which is comfortable to the human eye.

In still another aspect, the device is a symmetrical shape, such as a square or rectangular; however, in alternative aspects, asymmetrical, or irregular shapes can also be made.

In yet another aspect, the present invention includes a thin LED flat luminaire, comprising: a LED bar having at least one light emitting diode disposed thereon; an optical stack having an edge that abuts the LED bar, including, from top to bottom, a flat baseboard, a flat reflection panel for receiving light from the LED bar, a flat acrylic panel having a top surface and a bottom surface, the top surface facing the flat reflection panel, the top surface having a mask pattern printed thereon, the mask pattern for filtering light transmitted from the flat reflection panel into the flat acrylic panel for providing a uniform transmission of the light from the acrylic panel across the bottom surface of the flat acrylic panel, and a flat diffusion panel configured to receive the light from the bottom surface of the flat acrylic panel and emit the light into a space to be illuminated.

In another aspect, the present invention also includes an encasement frame clamped onto the stack and fastened together at each corner with corner joiners.

In still another aspect, the mask pattern is printed with meshing dots, the printed pattern of meshing dots being less dense farther from the LED bar light source and more dense closer to the LED light source so as to selectively filter more light closer to the LED light and less light father from the LED light source to provide for uniform transmission of light from the acrylic panel across the bottom surface of the flat acrylic panel.

In yet another aspect, the printed meshing dot pattern is determined by the shape and size of the luminaire, area of the light emitting surface, and wattage of light emitting diodes. In another aspect, the mask filter is printed using black ink.

In another aspect, the diffusion panel is an optical polypropylene panel manufactured with magnifying capability to provide optimal distribution of light, and in still another aspect, the diffusion panel is treated to transmit light with a selected warmth and color characteristic.

In a further aspect, the mask pattern is generated by a printer controlled by a computer programmed with software commands to generate a pattern in accordance with the equation:

$$f(j) = \frac{a}{\sqrt{1 + \frac{[(\frac{a}{b})^2 - 1]}{180^2}(j - 180)^2}}$$

where a is the ratio of dot density in the center of a light area of the acrylic panel, and j is the ratio of dot density near the LED bar.

Other features and advantages of the invention will become apparent from the following detailed description, taken in conjunction with the accompanying drawings, which illustrate, by way of example, the features of the invention.

BRIEF DESCRIPTION OF THE DRAWINGS

FIG. 7 is a perspective side view of one embodiment of the LED bar illustrated in FIG. 2.

FIG. 8 is a perspective side view the embodiment of the LED bar of FIG. 7 showing the interface of the LED bar and the various panels of the luminaire.

DETAILED DESCRIPTION OF THE PREFERRED EMBODIMENTS

Figure 1:
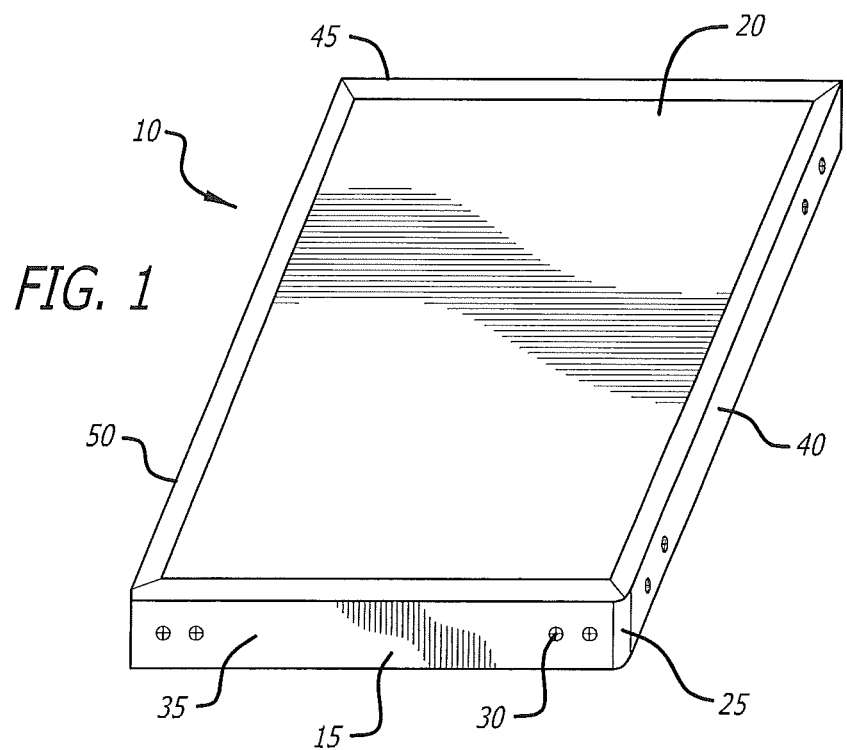
FIG. 1 is a perspective view of one embodiment of a thin LED flat luminaire, looking at the light emitting face of the device.

Referring now to the drawings in detail, in which like reference numerals indicate like or corresponding elements among the several figures, there is shown in FIG. 1 an exemplary thin flat luminaire constructed in accordance with principles of the present invention.

Thin flat luminaires of the type illustrated in FIG. 1 are useful in providing light in a more efficient manner than can be accomplished using prior art florescent fixtures. Such fixtures are commonly used in public spaces, and may take the form of square or rectangular fixtures. Common sizes of such fixtures are four feet by two feet, and two feet by two feet. Other sizes and shapes are also possible.

Light Emitting Diodes, or LEDs, are highly efficient sources of light whose mean time between replacement is also significantly greater than florescent or incandescent light sources. LEDs however, are typically relatively small in size, and thus provide light that is relatively intense and focused within a small area.

The various embodiments of the present invention incorporate LEDs to provide light, but then provides a structure that disperses the light uniformly over the entire area of the luminaire fixture. To accomplish this, as will be discussed in more detail below, the LED light is reflected and diffused in a manner which provides for a relatively uniform emission of light from the surface of the luminaire.

As seen in FIG. 1, in one embodiment, the luminaire 10 includes an encasement frame 15 that is used to hold a number of panels in alignment. FIG. 1 is a view looking at the light emitting surface of the luminaire 10, which is defined by a diffusion panel 20. The encasement frame includes a number of elongated structural members 35, 40, 45 and 50 which may form a square or rectangle, depending on the relative lengths of the various elongated structural members. For example, where the length of elongated structural members 35, 40, 45 and 50 are equal, a square luminaire results. Similarly, where elongated structural members 40, 50 are longer than members 35, 45, a rectangular luminaire is formed.

Figure 2:
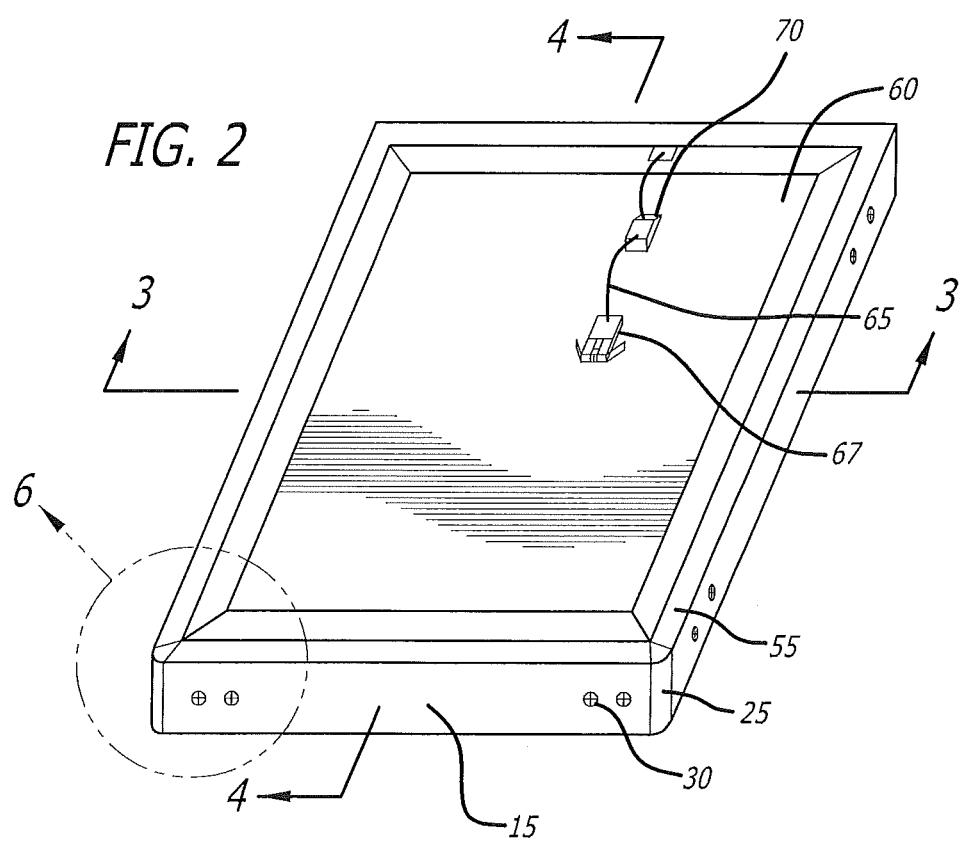
FIG. 2 is a perspective view of the embodiment of FIG. 1 showing the luminaire from the backside.
Figure 6:
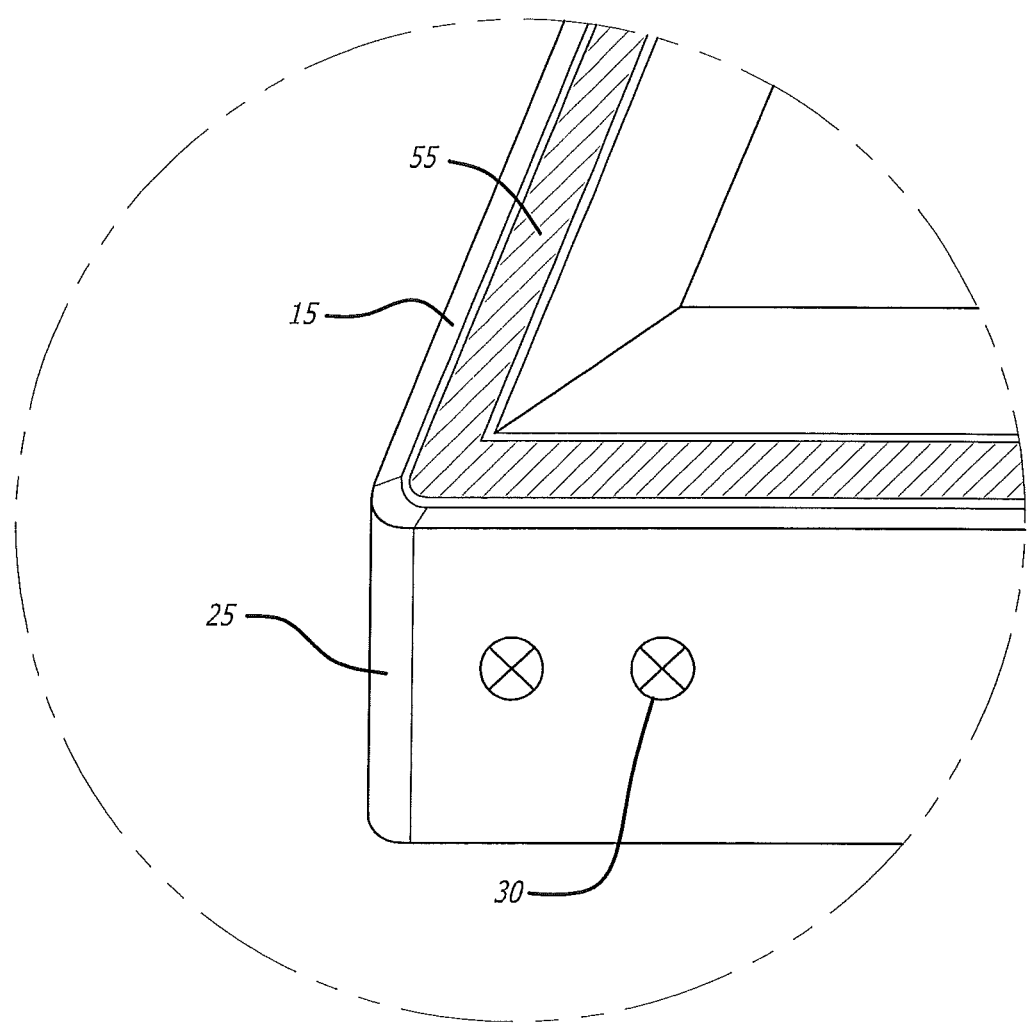
FIG. 6 is an enlarged view of a corner of the embodiment of FIG. 2.

FIG. 2 and FIG. 6 illustrate details of the construction of the encasement frame 15. Elongated structural members 35 and 40 are joined using a fitting 55 that forms a corner joint. Fitting 55 is an elongated member having bent into a right angle (90 degrees) to form the corner. The right angle may be sharply defined, or it may have a radius to soften the shape of the corner for safety and aesthetic purposes. When bent into a right angle in this fashion, fitting 55 has a pair of wings that are used for reinforcing the corner of the encasement frame, and also provide a foundation for attaching the elongated structural members together.

When placed between two of the elongated structural members, each wing of fitting 55 extends from an edge of the structural member for a distance along the longitudinal axis of the structural member. At least one screw 30 is used to fasten the elongated structural member 35, 40 to the fitting 55 to join the elongated structural members together. Fitting 25 may be formed of steel or any other suitable material. A corner joiner 25 may also be used to fill any gap that occurs between two elongated structural member if necessary to provide an aesthetically pleasing corner joint. As will be apparent to those skilled in the art, other designs and shapes for the encasement frame may be used, and are contemplated as being within the scope of the present invention.

Also visible in FIG. 2 is a baseboard 60 which forms the back of the luminaire. Power is provided to the LED light source or sources within the luminaire using a wire 65. Depending on the installation of the panel, the panel may be wired directly to a power source, or alternatively, an electrical plug 67 may be provided. A transformer 70 is also provided between the plug and the LED light source to reduce the voltage from the power source to a voltage that is required to operate the LED light source. Additional circuitry may be included to transform the alternating current into direct current if required by the LED light source.

The encasement frame may be formed from materials such as steel or aluminum provided it can rigidly support the components of the luminaire. For example, in one embodiment, the encasement frame is formed from an aluminum alloy material such as AL6063. The encasement frame maybe coated with vinyl or other materials to provide an aesthetic appearance.

Figure 3:
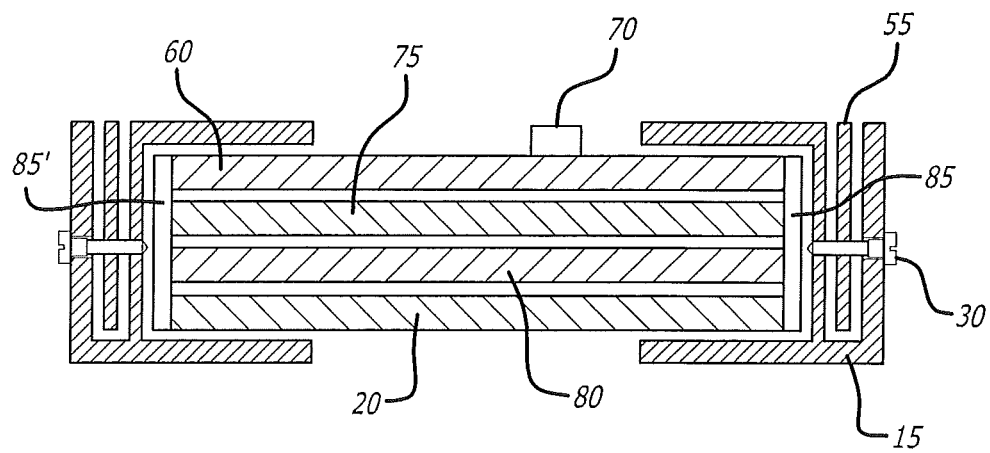
FIG. 3 is a cross-sectional view of the embodiment of FIG. 2 as indicated by line A, illustrating the various components of the luminaire.

FIG. 3 is a cross-sectional view of an embodiment of the luminaire showing the arrangement of the components contained within the encasement frame 15 that provide the light that is emitted from the diffusion panel 20 (FIG. 1). As shown in this figure, encasement frame 15 holds a baseboard 60, a reflection panel 75, and acrylic panel 80, and a diffusion panel 20 in a stacked arrangement, with the baseboard forming a backside of the luminaire, and the diffusion panel forming the light emitting surface of the luminaire. A LED bar 85 abuts one edge of the stack of panel, transmitting light into the edge of the reflection panel 75. Note that the LED bar 85 does not illuminate the diffusion panel 20 directly, and thus light emitted from the bottom surface of the diffusion panel is not emitted directly from the LED bar. This eliminates the potential discomfort or harm resulting from directly viewing the intense light produced by the LED bar. In an alternative embodiment, a second LED bar 85' may also be used, located on the opposite side of the stack from LED bar 85 where necessary to provide sufficient light to the stack to provide a sufficient amount of illumination from the bottom surface of the diffusion panel.

The baseboard 60 is typically formed from an opaque material having sufficient structural rigidity to stabilize the assembly when the luminaire is installed. In one embodiment, galvanized steel sheet approximately 0.500 millimeters in thickness has been found to be suitable, but other thicknesses and materials may be used depending on the design and functional requirements of the particular size or shape of the luminaire.

The LED bar is positioned so that it emits light into the edge of the flat reflection panel 75. The light transmitted into the edge of the reflection panel is reflected within the thickness of the panel in a manner well known to those skilled in the art, and, as will be described in more detail below, is ultimately coupled out of the reflection panel and into the acrylic panel 80.

In one embodiment, a filter mask having a mesh-like pattern is formed on the top surface of the acrylic panel 80. This mesh-like pattern serves to differentially couple light from the reflection panel into the acrylic panel in such a way that the light being emitted from the bottom surface of the acrylic panel into the diffusional panel 20 has a uniform intensity across the area of the bottom surface of the acrylic panel 80.

The diffusion panel 20 may further amplify and distribute the light uniformly to the space to be illuminated. As will be discussed more fully below, the diffusion panel may also be treated to change the color temperature of the light to enhance the warmth and color of the illumination as desired.

In one embodiment, the LED bar 85, 85' is a metal core printed circuit board. The sizing and luminosity of the LED bar is selected depending upon the requirements of the final luminaire. Other designs for an LED bar may be used as dictated by the design requirements of the luminaire without departing from the contemplated scope of the invention.

The reflection panel 75 is preferably formed of polyethylene terephthalate ("PET") which is a thermoplastic polymer resin that has reflective and opaque properties and, in one embodiment, is approximately 0.188 millimeters in thickness. The purpose of the reflection panel is to provide a medium to reflect light rays from the LED bar onto the top surface of the acrylic panel 80.

The acrylic panel 80 may be formed from poly(methyl methacrylate) ("PMMA"), commonly known as acrylic glass. In one embodiment, the acrylic panel is approximately 3.00 millimeters in thickness. As stated previously, a mesh-like mask pattern is applied to the top surface of the acrylic panel. This pattern is typically applied in a manner wherein the density of the pattern decreases as the distance across the panel increases in relation to the LED bar so as to couple more light from the reflection panel into the acrylic panel the farther away from the LED bar. This pattern filters the intensity of the light rays coupled into the acrylic panel 80 by the reflection panel 75 so as to achieve a uniform light distribution across the emitting surface of the luminaire.

The diffusion panel 20 is typically formed of optical polypropylene material, which, in one embodiment, is approximately 1.500 millimeters in thickness. This panel diffuses the light to the space with even distribution providing warmer light rays which are visually comfortable to the human eye.

Figure 4:
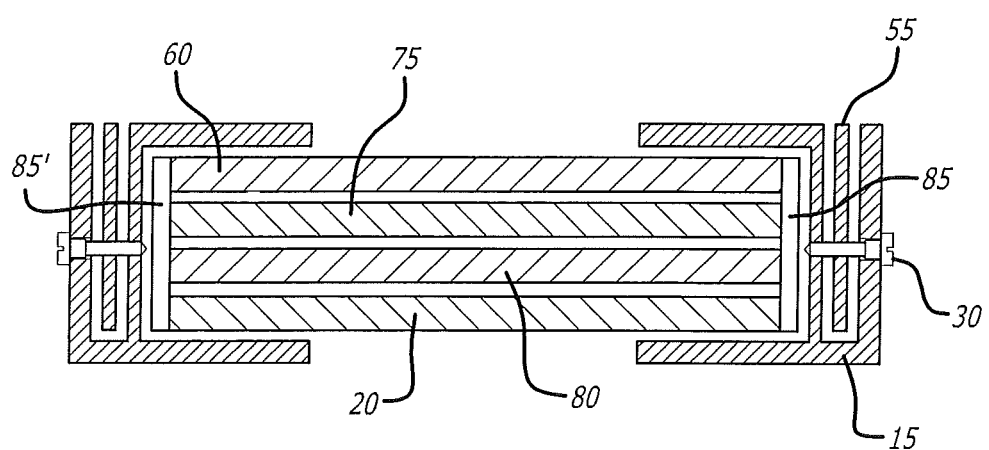
FIG. 4 is a cross-sectional view of the embodiment of FIG. 2 as indicated by line B, illustrating the components of the luminaire.

FIG. 4 is a further illustration of the arrangement of the panels within the encasement frame. This view is rotated 90 degrees from the view shown in FIG. 3, and thus the LED bars 85, 85' are not visible.

Figure 5:
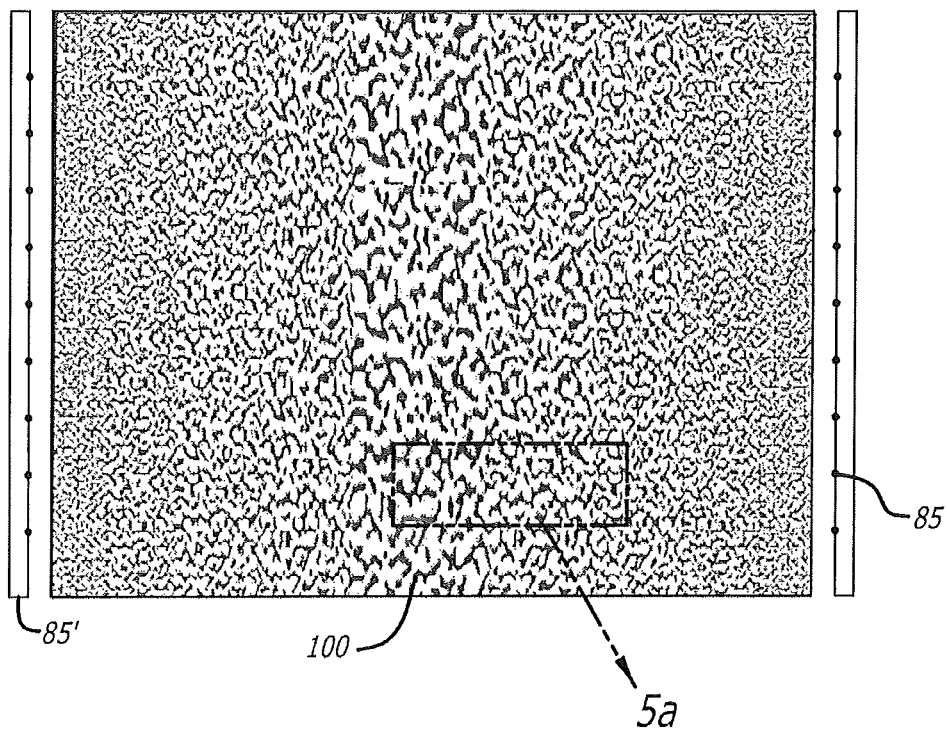
FIG. 5 is a top view of one embodiment of the acrylic panel of FIG. 3, showing the distribution of a pattern printed onto the acrylic panel for reflecting light produced by an LED bar to provide uniform distribution of the light across the illuminating area of the luminaire.
Figure 5A:
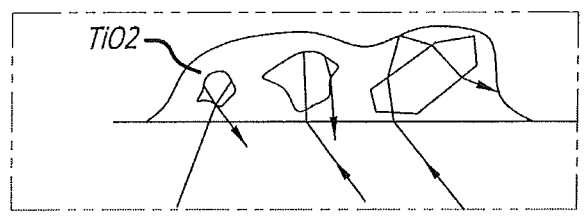
FIG. 5A is an enlarged cross-sectional view of a portion of the acrylic panel of FIG. 5, showing how light is reflected by particles of varying size embedded within an ink layer that has been applied to the acrylic panel.

Referring now to FIGS. 5 and 5A, a mask pattern 100 that is applied to the top surface of the acrylic panel 80 will now be described. Since the light from the LED bar is transmitted into the edge of the reflection panel 75, the distribution of light across the width of the reflection panel is not uniform. One skilled in the art will immediately understand that the intensity of light available to be coupled into the acrylic panel immediately adjacent the LED bar is far greater than the intensity of light available at a point (or area) farthest from the LED bar. Thus, if no mechanism is used to adjust the intensity of light transmitted through the acrylic panel, the light emitted by the diffusion panel into the space to be illuminated would not be uniform. In other words, if one looked at such a luminaire, the luminaire would appear brightest at the edge where the LED bar is located, and would be dimmest at the farthest distance across the luminaire from the LED bar. Such a result is not acceptable for aesthetic and functional reasons.

To address this problem, and to ensure uniformity of illumination across the emitting surface of the luminaire, a mesh-line mask filter is applied to the top surface of the acrylic panel 80. In one embodiment, the mask filter is formed by printing the pattern on the acrylic panel using an ink that is composed of titanium dioxide ($TiO_2$) and barium sulfate ($BASO_4$). Other inks may be used that satisfy the requirements that will be discussed in more detail below. It is important that the index of refraction of the components of the ink cooperate with the optical properties of the acrylic material of the acrylic panel such that the light within the panel is reflected or deflected in a manner that ensures the light is evenly distributed across the acrylic panel.

As discussed previously, the acrylic panel is preferably formed of PMMA, which has a refractive index of 1.49 (25 degrees Celsius). This results in a reflection angle within the acrylic panel of 42.2 degrees. When the reflection angle is less than 45 degrees, light traveling in a specific direction within the panel can be reflected numerous times within the panel, providing for dispersion of the light throughout the panel.

The mask filter alters the coupling of light from the reflection panel into the acrylic panel, constructively and destructively interfering with the light in a manner that provides for uniform emission of the light from the bottom of the acrylic panel. To accomplish this, the density of the mask filter must change depending on the distance of a particular point on the acrylic panel from the light source (LED bar 85, 85'). As shown in FIG. 5, the density of the mask pattern 100 is most dense at points closes to LED bars 85, 85', and least dense in the middle of the panel, which is the farthest portion of the panel away from LED bars 85, 85'.

The mask filter may take the form, for example, of a mesh of interconnected dots. In the middle of the panel, the radius of the dots is large, and the mesh connecting the dots is also thicker. This results in a reduced density of the pattern, allowing more light to be coupled into the acrylic panel from the reflection panel. The closer to the light source, the smaller the radius of the dots is and the thinner the mesh is, resulting in a denser pattern that allows less light to be coupled into the acrylic panel. In this arrangement, the closer to the light source, the less light is reflected or deflected in order to even out with the light intensity at the farther away area.

The mask filter is designed in such a manner so as uneven light emitting from the luminaire is not visible to the human eye. To accomplish this, it is important to minimize the overlay of dots in the filter. In one embodiment of the present invention, dot overly is minimized utilizing a method called Low Discrepancy Sequences (LDS).

If the gap between dots is N, and the gap is desired to be closed within an allowable variance, $D_N$, the follow formula can be used:

$$D_N(LDS) \leq C \frac{(\log N)^2}{N} \quad \text{Equ. 1}$$

where C is a constant and has no relation to N dots, and $D_N$ is defined by $0 \leq x, y \leq 1$.

Thus, $D_N$ can be calculated as:

$$D_N = \sup_{(x,y) \in [0,1]^2} \left| \frac{\#E(x,y)}{N} - xy \right| \quad \text{Equ. 2}$$

where x, y is the vector of (0,0) and (x,y).

The vector divides the dots within the area. N is the entire dot count. The absolute number derived from the formula is the difference between the percentage of the dots and the percentage of the area. When the dots are getting very dense, the number is near 0; therefore it represents the variation of the dots. This avoids sporadic spread of the dots.

Even though the LDS design results in an even spread of the dots in the mesh, the diameter of the dots is limited, therefore overlap of the dots may still occur. In order maintain a distance between the dots, it is necessary to apply a further dynamic theory to determining the position of the dots. In this method, it is assumed that the dots will react with each other, and that reaction results in a repulsive force between each of the dots.

Assuming that dot i and dot j result in repulsive force, and assuming that the positions of dots designed by the LDS method are the initial location calculated as shown below:

$$f_{i,j} m \frac{d^2 r_i}{dt^2} + c \frac{dr_i}{dt} = F_i = \sum_j f_{i,j} \quad \text{Equ. 3}$$

where m and c are constants. Assuming $t_0$ to be an initial time, the $t > t_0$:

$$r_i(t) = r_i(t_0) + \frac{1}{c} \int_{t_0}^{t} dt' F_i(t') \left[ 1 - \exp \frac{c(t-t')}{m} \right] \quad \text{Equ. 4}$$

Based on Equ. 4, assuming unlimited repulsive forces between dots, such that the final balance of the reactions becomes 1, the dot location can be calculated as:

$$r_i(t + \Delta t) - r_i(t) = \frac{1}{c} \Delta t F_i(t) \quad \text{Equ. 5}$$

The LDS design results in an even spread of dots, and is more efficient than other methods, such as apply a fuzzy logic algorithm. Further efficiency is obtained by applying both LDS and repulsive force methods to dot pattern design.

In most circumstances, then, the following equation may be used to design the dot pattern:

$$f(j) = \frac{a}{\sqrt{1 + \frac{\left[ \left(\frac{a}{b}\right)^2 - 1 \right]}{180^2}(j-180)^2}} \quad \text{Equ. 6}$$

where a is the ratio of dot density in the center of the light area, and j is the ratio of dot density near the light source.

The pattern designed using these methods will vary depending on the shape and size of the luminaire, the area of the light emitting surface and the wattage of the fixture. As described above, the acrylic panel 80 is positioned in the stack such that the printed pattern faces the reflection panel 75, that is, the dots are printed on the top of the acrylic panel.

Once the light rays are filtered by the acrylic panel 80, the light rays are directed through the diffusion panel 20, which amplifies the light and distributes the light evenly to the space to be illuminated. The diffusion panel also softens the light in such a manner that the light appears warmer and is more comfortable to the human eye. In some embodiments, the diffusion panel may also be treated or coated to provide a magnification effect. In still other embodiments, the color and surface texture of the diffusion panel may be varied according to the customer's requirement for the color of the light and for aesthetic appearance.

Referring again to FIGS. 2 and 6, the assembly of the stack and the LED bar is achieved by the encasement frame which may be a prefabricated aluminum alloy in the cross-sectional shape as shown in FIG. 3. In order to achieve the maximum durability, the ninety degree corner may be formed by a corner joiner 25 connecting to two straight pieces of aluminum. The corner joiner may be made of plastic, aluminum, or other suitable material. This corner transition is tighter and more attractive than fabricating bent corners from a continuous piece of aluminum alloy. As illustrated in FIG. 6, the encasement frame 15 is fastened with screws 30 to a ninety degree steel joiner 55 in the middle of the aluminum alloy encasement frame. At each corner there is an area with the corner joiner connecting the straight aluminum pieces outside of the frame. For durability and aesthetic appearance, there is a ninety degree steel joiner in the middle of the aluminum alloy encasement frame to receive the fastening screws. All three parts, aluminum alloy encasement frame, corner joiner, and steel joiner, are fastened together with the screws from the side of the aluminum alloy encasement frame.

FIG. 7 is a perspective side view of one embodiment of a LED bar suitable for use in the luminaire of the present invention. In this embodiment, LED bar 200 includes a structural member 205 in the form of an elongated strip upon which are mounted a plurality of light emitting diodes 210. Electrical wire leads 215 provide electrical power of the proper voltage and type (alternating or direct current) to the light emitting diodes. In some embodiments, chip resistors 220 may also be used to ensure proper operation and reliability of the light emitting diodes.

FIG. 8 is a perspective side view illustrating how the stack of panels aligns with the LED bar 220 of FIG. 7. In this embodiment, baseboard 60, reflection panel 75, acrylic panel 80 and diffusion panel 20 are stacked upon each other and then positioned so that an edge of the panels abuts the LED bar 220. Light from the light emitting diodes 210 is transmitted into the edges of the reflection panel, the edges of the acrylic panel and diffusion panel being opaque or otherwise rendered non-receptive to the light from the LED bar so that no light from the LED bar is received into the edges of the acrylic and diffusion panels and thus is not propagated throughout those panels.

The mask pattern may be printed on the acrylic panel using various methods. For example, in one method, the surface of the acrylic panel facing the reflection panel is polished until shiny. The dot pattern is first engraved on a sheet with holes penetrating through the sheet to allow passage of ink through the sheet. The sheet is then laid upon the shiny surface of the acrylic panel, and the ink is applied. The acrylic panel is then placed into an oven to dry the ink. This method, however, may result in low quality, because the ink may not be able to flow through very small holes in the sheet, thus printing a pattern that may not provide optimal filtering of the light as it is transmitted into the acrylic panel.

Another method uses a laser printer to print ink to form the mask pattern directly on the shiny surface of the acrylic panel. The laser printer is controlled either by a specialized computer designed to generate the dot patterns in the method described above, or is controlled by a general computer operating under the control of software commands specifically designed to operate the computer to carry out the generation of the patterns in accordance with the methods of the present invention. The mask pattern may be generated all at once, saved, and then used to control the laser printer to print the pattern onto the acrylic panel, or the mask pattern may be printed as it is generated by the computer. Other methods of printing the patterns in accordance with the present invention may also be used, as long as they provide high quality patterns capable of providing a uniform dispersion of the light received from the reflection panel to the acrylic panel.

In its various embodiment, luminaires in accordance with the principles of the present invention can be adapted for all indoor light environments, including, but not limited to, ceiling mount, T-Bar track mount, suspension, and enclosure by other construction materials with equivalent safety characteristics. Screws can also attach suspension clips or loops to the encasement frame. These loops are used to connect to a support system in an open ceiling environment.

While several particular forms of the invention have been illustrated and described, it will be apparent that various modifications can be made without departing from the spirit and scope of the invention.

I claim:

1. A flat LED luminaire, comprising:
   a LED bar having at least one light emitting diode disposed thereon;
   an optical stack having an edge that abuts the LED bar, including, from top to bottom,
   a flat baseboard,
   a flat reflection panel for receiving light from the LED bar,
   a flat acrylic panel having a top surface and a bottom surface, the top surface facing the flat reflection panel, the top surface having a mask pattern formed thereon using a laser process, the mask pattern for filtering light transmitted from the flat reflection panel into the flat acrylic panel for providing a uniform transmission of the light from the acrylic panel across the bottom surface of the flat acrylic panel, and
   a flat diffusion panel configured to receive the light from the bottom surface of the flat acrylic panel and emit the light into a space to be illuminated; and
   an encasement frame disposed about the stack and LED bar.

2. The flat LED luminaire of claim 1, further comprising an adhesive layer disposed between the flat baseboard and the flat reflection panel, and between the flat reflection panel and the flat acrylic panel resulting in an integral optical stack.

3. The flat LED luminaire of claim 1, wherein the laser process is a laser engraving process.

4. The flat LED luminaire of claim 3, wherein the LED bar and the stack are circular in shape.

5. The flat LED luminaire of claim 1, wherein the mask pattern is formed with meshing dots, the printed pattern of meshing dots being less dense farther from the LED bar light source and more dense closer to the LED light source so as to selectively filter more light closer to the LED light and less light father from the LED light source to provide for uniform transmission of light from the acrylic panel across the bottom surface of the flat acrylic panel.

6. The flat LED luminaire of claim 5, wherein the formed meshing dot pattern is determined by the shape and size of the luminaire, area of the light emitting surface, and wattage of light emitting diodes.

7. The flat LED luminaire of claim 5, wherein the mask pattern is a mesh of interconnected dots.

8. The flat LED luminaire of claim 7, wherein the interconnected dots have a radius, and the interconnecting mesh has a thickness, the radius of a dot being a function of the distance of the dot from the LED bar and the thickness of the interconnecting mesh being a function of the distance of a mesh connecting two adjacent dots from the LED bar.

9. The flat LED luminaire of claim 8, wherein the radius of a dot is smaller, and the thickness of the mesh thinner as the dot and the mesh are closer to the LED bar.

10. The flat LED luminaire of claim 1, wherein the mask filter is formed by incorporating a composition of titanium dioxide and barium sulfate into the flat acrylic panel and illuminating the flat acrylic panel with the incorporated composition with a laser.

11. The flat LED luminaire of claim 1, wherein the diffusion panel is treated to transmit light with a selected warmth and color characteristic.

12. The flat LED luminaire of claim 1, wherein the mask pattern is generated by a laser controlled by a computer programmed with software commands to generate a pattern in accordance with the equation:

$$f(j) = \frac{a}{\sqrt{1 + \frac{\left[\left(\frac{a}{b}\right)^2 - 1\right]}{180^2}(j-180)^2}}$$

where a is the ratio of dot density in the center of a light area of the acrylic panel, and j is the ratio of dot density near the LED bar.

* * * * *